Jan. 13, 1959  G. REYMONENQ ET AL  2,869,113
REMOTE METERING SYSTEM
Filed Jan. 28, 1955  4 Sheets-Sheet 2
FIG. 3
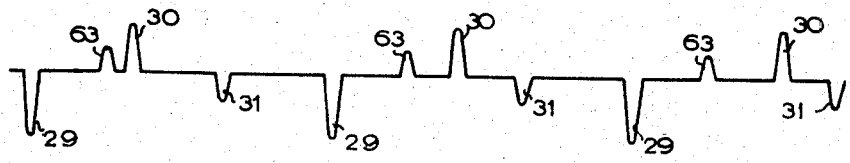
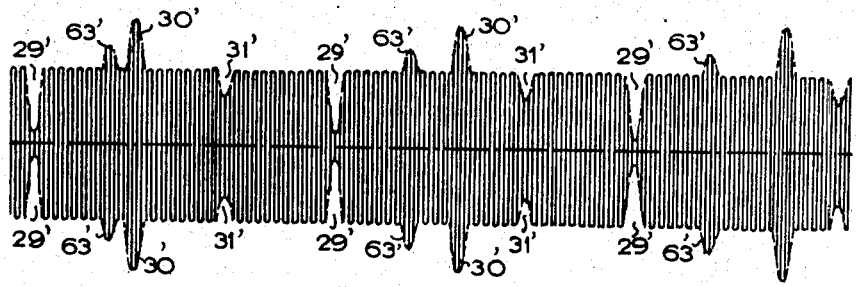
FIG. 6  FIG. 2
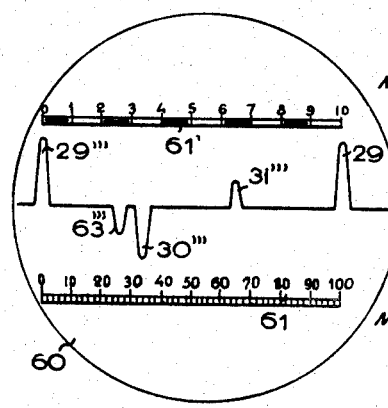 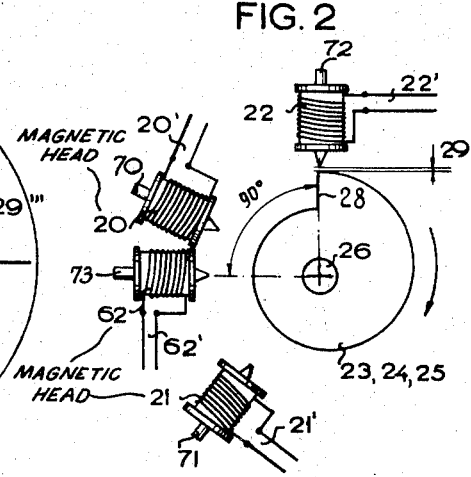
Inventors
G. Reymoneng
P. Ouvrard Inventors
G. Reymoneng
P. Ouvrard United States Patent Office 2,869,113
Patented Jan. 13, 1959

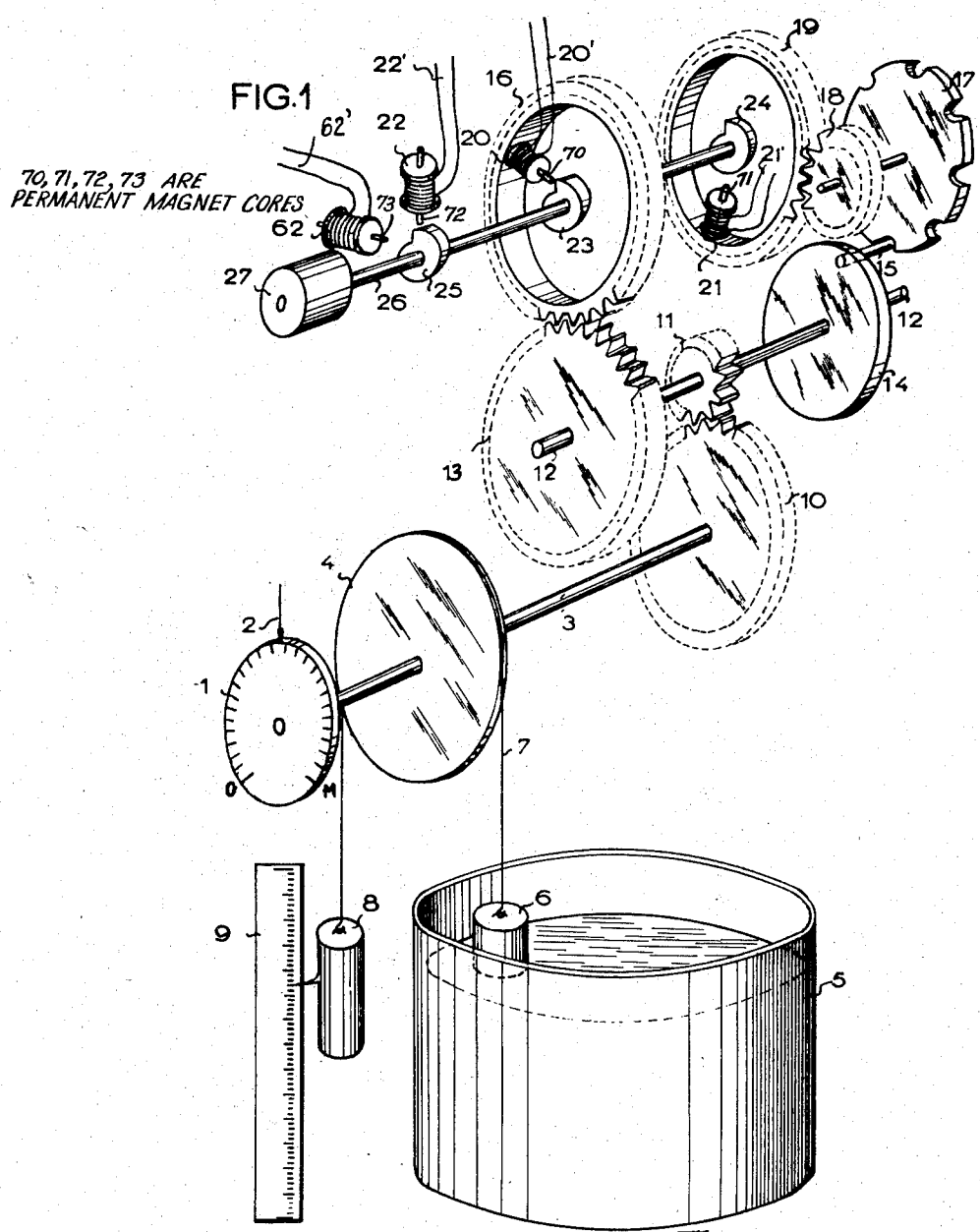

2,869,113

REMOTE METERING SYSTEM

Gaston Reymonenq and Paul Ouvrard, Donges, France, assignors to Antar Petroles de l'Atlantique, Paris, France Application January 28, 1955, Serial No. 484,729

Claims priority, application France May 7, 1954

1 Claim. (Cl. 340—206)

The present invention relates to a method and a system for the transmission of measurements and, more particularly, the transmission of a great number of measurements over a single line, with a degree of accuracy of the order of one thousandth, i. e., $\frac{1}{10}$ of one percent. One particular application of this invention is concerned with the teletransmission of the liquid levels in a plurality of tanks.

Many teleindicating systems are already known, in which the values given by a measuring apparatus are transmitted by means of a modulation of a high-frequency current. Among said systems, the low-frequency impulse systems are quite popular due to their inherent advantages from the point of view of the transmission proper. Actually, for transmitting the measurements, said systems make use either of the number, or the frequency or the relative position of the impulses without taking into consideration the amplitude of the impulses received, a condition which eliminates the effects of the random signals, which are quite detrimental in the amplitude modulation systems, and which also makes it possible to use transmission lines of a poor quality. Furthermore, since a well-defined frequency is impulse-modulated, it is possible to use a frequency band of relatively narrow width for the transmission of this modulation, with the result that it is possible to transmit, for instance on a single cable, a high number of similar measurements (normally about twenty).

Such systems, however, afford a poor accuracy. Whether the apparatus concerned make use of the impulse frequency or the impulse position with respect to a timing impulse, an indication only within ±2% (i. e. $\frac{1}{50}$) is obtainable under the most favorable conditions, when the distortion of the impulses is not excessive.

The object of the present invention is to provide a teleindicating system in which use is made of such impulse-modulated high frequency currents for transmitting the measurements, while a greater accuracy is reached than in the known systems, due to the use of two distinct impulses for each measurement.

The teleindicating system according to the invention essentially consists in dividing the measurement range into a predetermined number of divisions and in identifying the quantity to be measured by means of two measurement impulses, the position or phase of the first measurement impulse with respect to a periodical timing impulse defining only the division within which lies the measured quantity, while the position or phase of the second measurement impulse relative to the same timing impulse accurately defines the value of the measured quantity within said division. It will be easily understood that the position of the second measurement impulse within the division is defined with all the accuracy of which the impulse transmitting system is capable; in other words, the accuracy of the measurement is proportional to the number of divisions provided. The position of the impulse which identifies the division might be ascertained with the same degree of accuracy but, for the sake of safety, the positions of the impulses which define two adjacent divisions, respectively, are preferably spaced apart a distance twice as great as the possible error. By way of example, with the above indicated accuracy of ±2%, twenty-five divisions may be provided and finally the accuracy of the teleindicating device will be twenty-five times greater than that of devices operating on one single measurement impulse.

The teleindicating system according to the invention comprises at least one high frequency transmitter and a receiver, said high frequency transmitter having a periodical impulse train generator adapted to create the above timing and measurement impulses.

Other and further objects and advantages of the invention will be apparent to those skilled in the art, from a consideration of the following description of one embodiment of the invention, shown by way of example, in the accompanying drawings, in which:

Fig. 1 is a diagrammatical perspective view of the measurement and synchronous impulse generator, according to the invention, as more particularly applied to level measurements;

Fig. 2 is a simplified diagrammatical view of the portion of the above mentioned apparatus which effectively serves the purpose of producing the impulses;

Fig. 3 is a curve showing in 3a the impulses created by the generator and in 3b a high frequency current modulated by the said impulses;

Fig. 6 shows the aspect of the screen of the above mentioned receiver oscillograph.

Figure 4:
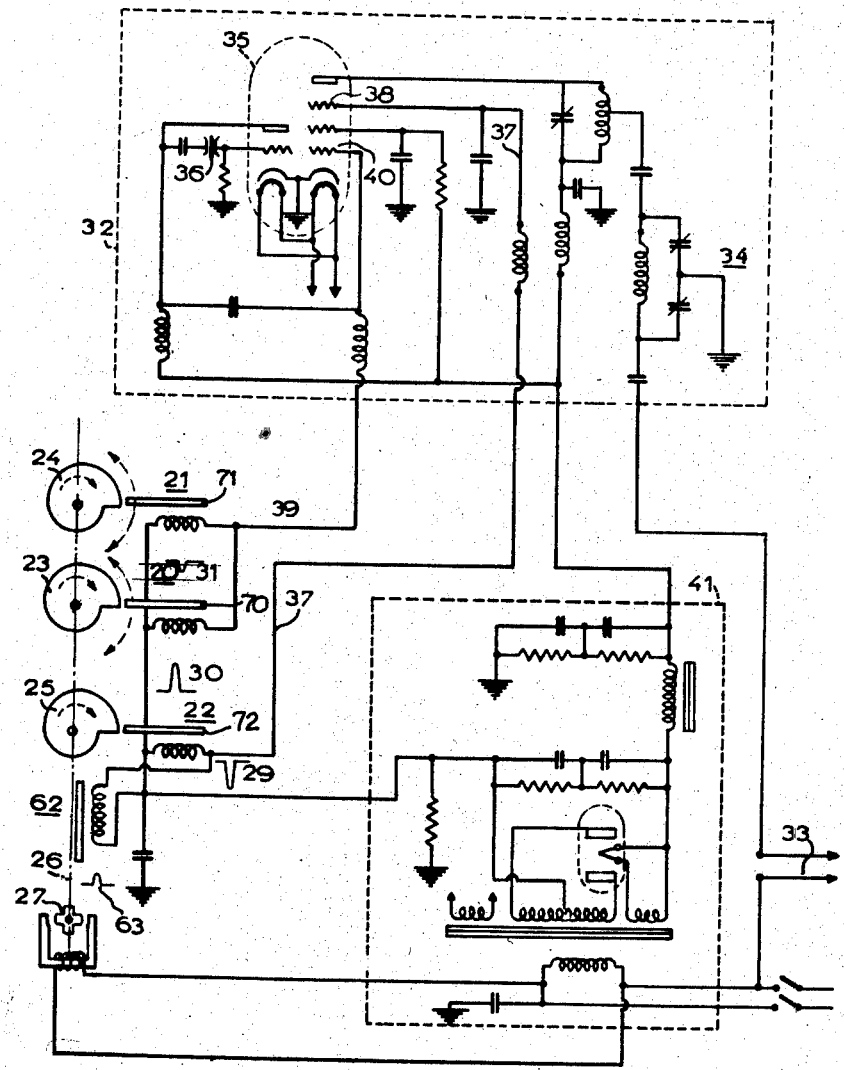
Fig. 4 is a wiring diagram of a preferred embodiment of a generator of high frequency current which is to be modulated by the impulses for teleindicating purposes.

Referring first to Fig. 1, 1 is a rotatable dial on which a measurement may be read by means of a stationary index 2; said measurement is to be transmitted to a remote station with a great accuracy (of the order of $\frac{1}{10}$ of one percent, or one thousandth). The dial 1 is rigid with a spindle 3 on which is keyed a sheave 4. In the example shown, it has been assumed that the measurement to be transmitted is the level of a liquid in a tank 5. Said level is detected by a float 6 suspended at one end of a thread running over the sheave 4 and at the opposite end of which is attached a counterweight 8 provided with an index. The thread is thus, continuously kept taut and the level of the liquid may be read on a scale with which the said counterweight index cooperates.

This portion of the device has been diagrammatically simplified to the greatest possible extent, since it is not an essential part of the invention and any other equivalent mechanical device could be substituted therefor.

If it is desired to transmit to remote stations measurements related to other variable quantities (for instance flows, current strengths, powers, etc.) a suitable device might be used for activating the spindle 3, if need be through the medium of a measurement amplifier many designs of which are well-known, in order that a sufficient torque be available to actuate the said spindle 3.

The rotational movement of the dial 1 together with the spindle 3 is transmitted to a shaft 12 through toothed wheels 10, 11. The transmission ratio of the toothed wheels 10—11 is such that, when the dial 1 rotates by an angle adapted to bring it from the zero (0) to the maximum (M) of the range of measurement, the shaft 12 effects a number of complete revolutions equal to the number of divisions provided within the range of measurement, i. e. twenty five in the example shown. On the shaft 12 are keyed a toothed wheel 13 and a disc 14 provided with a driving finger 15. The toothed wheel 13 meshes with and drives a hollow toothed drum 16 of the same pitch diameter which, therefore, accomplishes for instance twenty five revolutions as the dial 1 is rotated from 0 to M. Each time the disc 14 (and hence the shaft 12 and toothed drum 16) completes one full revolution, the driving finger 15 moves a notched disc 17 by one step forward or backward. A pinion 18 rigid with the notched disc 17 drives in turn a toothed drum 19 identical with the drum 16 and coaxial therewith. The number of notches in the disc 17 and the ratios between the pinion 18 and the toothed drum 19 are so chosen that the drum 19 rotates by an angle equal to the whole angular extent of the circular scale of the dial 1 each time the same is rotated from 0 to M, i. e. while the drum 16 effects twenty five complete revolutions. The rotation of the drum 19 takes place stepwise and it is adapted to assume twenty six distinct positions each corresponding to one of the twenty-six graduation marks limiting the twenty-five divisions of the circular scale of the dial 1. Thus, it will be seen that each angular position of the dial 1 is identified:

(1) By the position of the drum 19 identifying the graduation mark that immediately precedes index 2.

(2) By the angular position of the drum 16 which precisely indicates the angle between the said graduation mark and the index 2.

For example, if the angular position of the dial 1 corresponds to a level of 12⅖ inches in tank 5, drum 19 would be in its 13th angular position (identifying number 12, since the first position corresponds to zero), while drum 16 would be at ⅖ of a turn from its zero position.

The hollow toothed drums 16 and 19 each comprise in the interior thereof a magnetic scanning head 20, 21 each provided with a permanent magnet 70, 71 adapted to create the measurement impulses. The angular position of said scanning heads respectively fixed on the drums 16 and 19 determines the phase shifting of said impulses relative to the timing impulses created by a stationary scanning head 22 provided with permanent magnet 72.

The impulses are generated in the following manner: (Fig. 2) opposite each scanning head 20, 21, 22 and also the similarly constructed head 62 (as hereinunder described) are positioned solid drums or rotors 23, 24, 25 made of a material with a high magnetic permeability and fixed on a common shaft 26 driven at high speed by an asynchronous motor with a practically constant speed or preferably a synchronous motor 27. Said drums are spiral shaped with an abrupt step 28 (Fig. 2). At the moment this step 28 comes into registration with one of the scanning heads 20, 21, 22 and 62, the latter having permanent magnet core 73, the sudden variation in the permeability of the corresponding magnetic circuit induces a current impulse in the coil of the corresponding scanning head. Hence, all four scanning heads will each induce an impulse after each revolution of the shaft 26 and four series of impulses will be generated at the same frequency.

The minimum air gap between the nose of the drums 23, 24, 25 and the scanning heads 20, 21, 22 and 62 is made very thin. By suitably selecting the impedance of the coils and the strength of the permanent magnet, current impulses of 30 to 40 v. may be obtained with a motor having a rotational speed of 1,500 R. P. M. The angular shifting (for instance 90°) of the scanning head 62 is determined once for ever. The purpose of this scanning head is to create a calibration impulse, the purpose of which will be indicated hereunder.

The phase shifting of the measurement impulses with respect to the timing impulses obviously depends on the angular position of the said heads with respect to the fixed scanning head 22. Therefore, it is clear that the phase of the measurement impulses across the scanning head terminals depends on the positions of the drums 16 and 19 and, hence, on the position of the dial 1.

The current impulses are directly received across the terminals 22' of the scanning head 22, across the terminals 62' of the scanning head 62, and at 20' and 21', across the terminals of the scanning heads 20, 21 through a commutator and brushes (not shown). By suitably selecting the phase, three series of periodic impulses may be obtained with the shape and phase as indicated in Fig. 3. In this figure, 29 denotes the negative timing impulses, 30 the positive fine measurement impulses created by the scanning head 20, 31 the negative coarse measurement impulses created by the scanning head 21, and 63 the positive calibration impulses. The phase shifting between 29 and 31, which is varied step-by-step as the dial 1 rotates, indicates the division on the dial within which the measurement lies, and the phase shifting (distance) between 29 and 30 accurately indicates the accurate position of the dial within the said division, i. e. the angle between the front end graduation mark of the said division and the exact position of the dial 1.

For the remote transmission of the measurements, a high frequency oscillation will be modulated in a high frequency transmitter 32 by means of the four impulses 29, 30, 31 and 63. The modulated high frequency wave is illustrated in Fig. 3b. The negative timing impulse 29 blocks the high frequency emission as at 29', while the positive impulses cause the amplitude to increase at 30' and 63' and the negative impulse 31 decreases the amplitude at 31'.

In a preferred embodiment (Fig. 4), the high frequency transmitter 32 comprises a single dual valve, namely a triode-pentode 35, the triode section of which is mounted as an oscillator, stabilized by a quartz 36, while the pentode section serves as a mixer-amplifier adapted to deliver an ample output power (of the order of 3 watts).

The high frequency energy is sent over the transmission line 33 through an impedance adapting circuit diagrammatically illustrated as at 34 in order to ensure a maximum efficiency.

The negative timing impulse 29 generated by the scanning head 22 is applied through the circuit 37 to the screen grid 38 of the pentode section of the dual valve so as to block the emission of this valve during the passage of the impulse 29. The calibration impulse 63 also applied to the screen-grid 38 increases the amplitude by reducing the bias.

Both measurement impulses 30, 31, the amplitudes of which are caused to be different by a suitable selection of the magnetic heads 20, 21, are applied through a common wire 39 to the control grid 40 of the pentode section which is normally biased to a negative potential sufficient to impart to the high frequency vibrations but one half to one third of the maximum amplitude when no impulse is taking place. The passage of the positive impulses will increase the amplitude and that of the negative impulses will decrease it, whereby the high frequency impulses 30' and 31' (Fig. 3b) are obtained. In the diagram block 41 (Fig. 4), a supply system with a transformer, double-diode rectifier and filters has been diagrammatically illustrated.

For the reception, a single receiver is provided for successively obtaining the indication of the values transmitted from several remote stations $P_1$, $P_2$ through impulse modulated high frequency currents having frequencies $F_1$, $F_2$, respectively. Subsequent to their amplification, the currents received are mixed with the frequency of a local oscillator (adapted to be adjusted to well-defined constant values $f_1$, $f_2$, such that $F_1 \pm f_1$, $F_2 \pm f_2$ always gives rise to a fixed medium frequency) which is also impulse-modulated.

Figure 5:
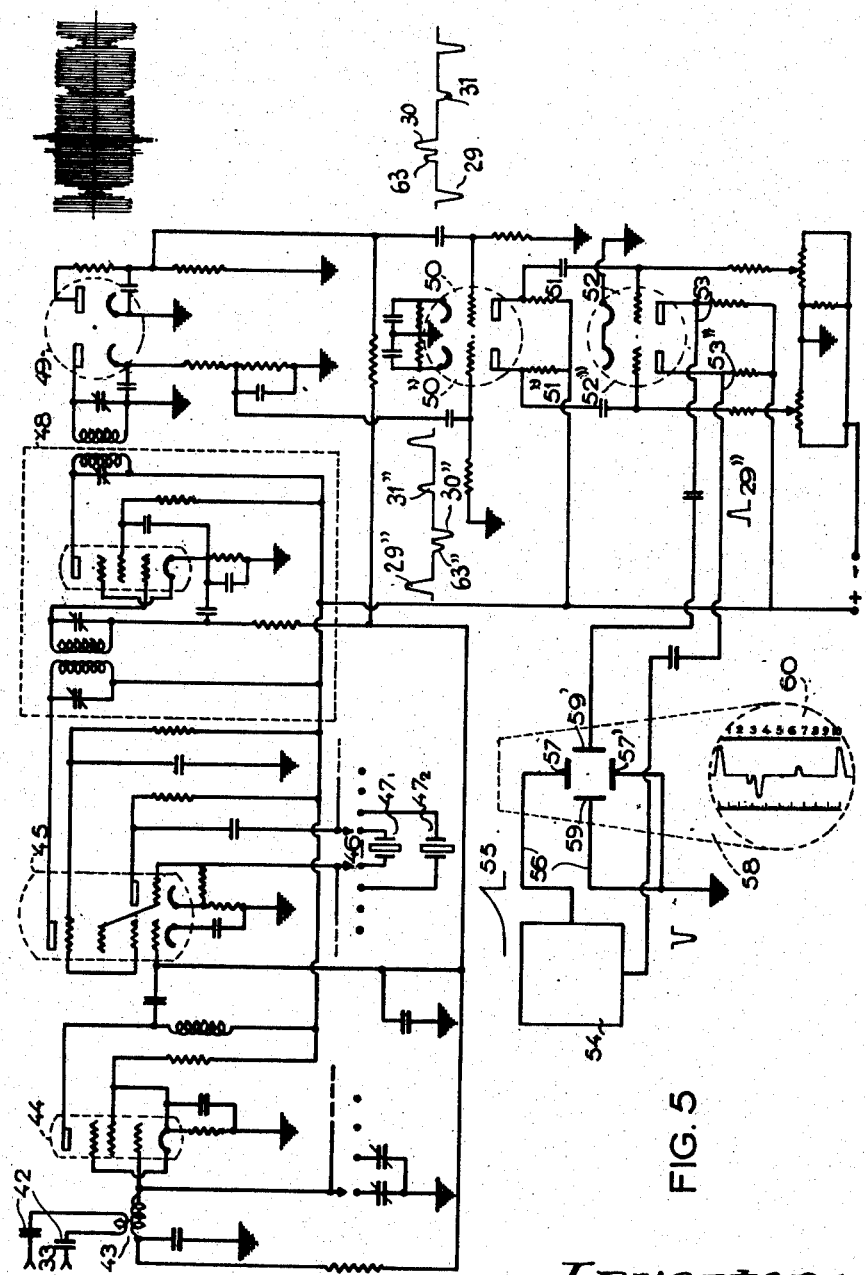
Fig. 5 is the wiring diagram of a receiver according to the invention serving the purpose of reproducing the measurement impulses on the screen of an oscillograph used as a teleindicating apparatus.

In one preferred embodiment, the high frequency currents emitted by the transmitters over the line 33 (Fig. 5) are led to the receiver through a capacitor connection 42 adapted to block the low frequency currents when, for instance, a conventional light or power mains is used as a transmission line. Thence, they are led through an impedance adapter (transformer 43) a preamplifier valve 44, the output of which is directed upon the control grid of the hexode portion of a triode-hexode dual valve 45. The triode portion of this value serves as an oscillator while the hexode portion serves as a mixer. In the circuit which forms an oscillator, a multiple switch 46 permits selectively switching on one of the quartzes $47_1$, $47_2$, for tuning the circuit to the frequencies $f_1$, $f_2$ . . . as above defined and making available at the output of the mixing hexode an impulse-modulated fixed medium frequency oscillation. This oscillation is amplified by a conventional medium frequency amplifier indicated as at 48. The output of this amplifier is directed upon a double detector stage constituted by a double diode 49 which makes it possible to obtain in two output circuits, on the one hand, the initial impulses 29, 30, 31, 63, without taking care of the distortions and, on the other hand, the same impulses in inverted condition 29″, 30″, 31″, 63″.

These impulses are separately amplified in a double-diode 50—50″, the output of which is directed into two amplifiers 52—52″, respectively. The amplifier 52″ is biased in such a manner as to allow the passage only of the positive impulses having a large amplitude. It will, thus, block the negative impulses 30″ and 63″ (i. e. 30 and 63 inverted) and the positive impulse 31″ having a short amplitude and it will only accept the timing impulse 29″. The timing impulse 29″ is directed through 53″ to the relaxation oscillator of a time-base generator 54 adapted to deliver a saw-tooth voltage having the same period as the impulses. The saw-tooth voltage 55 is directed through 56 to the vertical deflecting electrodes 57—57′ of a cathode-ray tube 58. If no horizontal deflection occurs, then the spot of the cathode-ray tube travels along a vertical line according to the impulse frequency. The measurement impulses 30, 31 as well as the timing and calibration impulses 29 and 63, respectively, are directed, subsequent to their amplification in 50—52, through the wire 53 to the horizontal deflecting electrodes 59—59′ of the cathode-ray tube 58. Hence, the spot will display on the screen 60 four teeth 29‴—30‴—31‴—63‴ (see Fig. 6), in response to the incoming impulses 29, 30, 31, 63. The timing tooth 29‴ serves for framing the spot and determining the scale. The phase shifting of the teeth 30‴ and 31‴ with respect to 29‴ is proportional to the distance between these teeth and the tooth 29‴. Using two suitable scales (Fig. 6), 61 and 61′, it will be possible directly to read opposite the tooth 31‴ the division of the measurement range contemplated, and opposite the tooth 30‴ the complement which gives the accurate measurement.

As many changes could be made in the above construction, and many apparently widely different embodiments of this invention could be made without departing from the scope of the claim, it is intended that all matter contained in the above description or shown in the accompanying drawings shall be interpreted as illustrative and not in a limting sense.

Now, the vertical deflection voltage may undergo slight variations causing disagreement between the spacing of two successive timing pulses 29‴ and the length of the reading scales. Moreover, it rarely happens that two timing pulses are simultaneously visible on the screen which makes impossible to detect such disagreement by comparing said pulses with the scales. This is the reason why the calibration impulse 63‴ is provided. One of the timing pulses 29‴ being brought into registration with e. g. the zero of the scales, the position of the fixedly phase-shifted calibration pulse 63‴ will indicate, if the readings are correct and, if not, to which extent they are to be corrected.

What is claimed is:

In an electric telemetering system for transmitting to a distance the indications of a measuring instrument having a digital scale by means of periodic timing pulses and a plurality of time spaced indicating pulses therebetween, each of which latter is indicative of the instantaneous value of variable digits units representing the measure to be transmitted; a voltage generator device comprising a rotatable shaft, a plurality of axially spaced disc shaped magnetically permeable devices mounted on said shaft to rotate therewith, each device having a spiral shaped peripheral portion terminating in a radial step, a permanent magnet pickup associated with each device and positioned in such radial relationship therewith that a voltage pulse is created in the pickup as said step passes the latter, one of said pickups being stationary and the other pickups being movable around their associated devices along a circular path concentric to said shaft at a speed to produce said periodic timing pulses in said stationary pickup and said indicating pulses in said movable pickups, and means for adjusting the angular position of each movable pickup in accordance with the digital units to be indicated.

References Cited in the file of this patent

UNITED STATES PATENTS

| | | |
|---|---|---|
| Re. 19,039 | Wilde | Jan. 2, 1934 |
| 2,110,746 | Tolson | Mar. 8, 1938 |
| 2,625,600 | Benaglio | Jan. 13, 1953 |
| 2,644,933 | Peterson | July 7, 1953 |
| 2,680,241 | Gridley | June 1, 1954 |